United States Patent [19]

Gallatin

[11] Patent Number: 5,369,886
[45] Date of Patent: Dec. 6, 1994

[54] PORTABLE ANNULAR BLADE POWER SAW

[76] Inventor: Charles A. Gallatin, 1511 S. Travis, Amarillo, Tex. 79102

[21] Appl. No.: 181,012

[22] Filed: Jan. 14, 1994

[51] Int. Cl.$^5$ ............................................. B23D 45/08
[52] U.S. Cl. .................................. 30/371; 30/123; 30/389; 7/149; 7/161
[58] Field of Search .................. 30/371, 389, 123, 390, 30/388; 144/343, 22; 7/148, 159, 161

[56] References Cited

U.S. PATENT DOCUMENTS 2,770,036 11/1956 Anderson ............................. 30/371
5,319,856 6/1994 Kolehmainen ........................ 30/371

FOREIGN PATENT DOCUMENTS 1057772 5/1959 Germany .............................. 30/123

Primary Examiner—Douglas D. Watts
Attorney, Agent, or Firm—Norman B. Rainer

[57] ABSTRACT

A light weight electric-powered radial saw intended to cut overhead limbs employs a housing having a forwardly direction U-shaped receiving yoke, and a rearwardly directed fitting which receives an elongated handle. An annular saw blade is rotatively supported within the yoke by a plurality of idler rollers journaled to the housing. An electric motor positioned within the housing has a drive shaft that extends in parallel relationship above the saw blade. A drive transmission device such as a gear is interactive between the drive shaft and the saw blade.

7 Claims, 7 Drawing Sheets

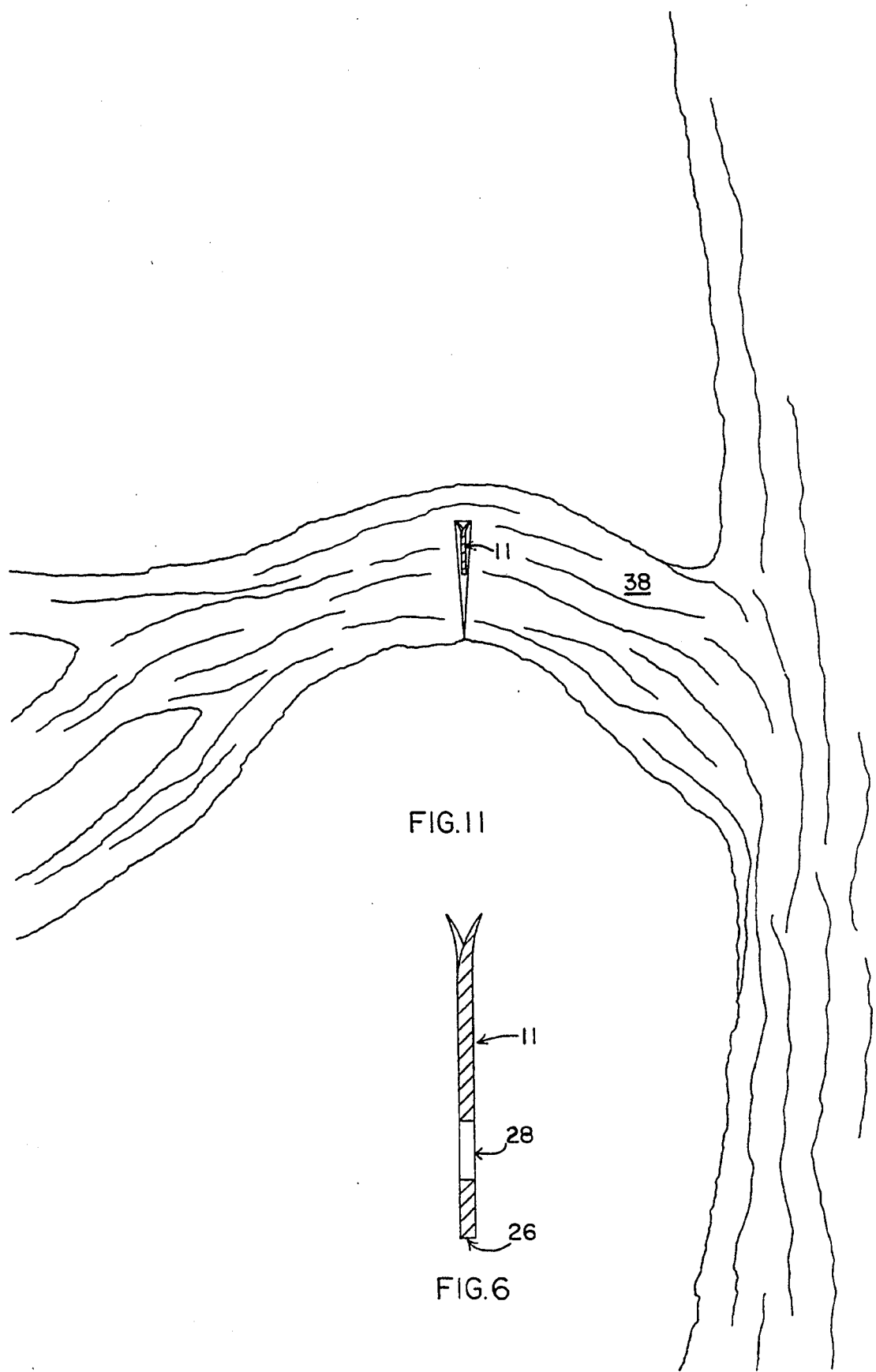

PORTABLE ANNULAR BLADE POWER SAW

BACKGROUND OF THE INVENTION

1. Field of the Invention

This invention relates to power tools, and more particularly concerns a lightweight hand held saw adapted to sever overhead tree limbs.

2. Description of the Prior Art

Numerous proposals have been made adapting circular saw blades and cutting disks for cutting standing trees. In the majority of the known devices, the circular saw blade is mounted on a central axle and is rotated at high speeds, i.e. rim speeds in the range of 10,000 to 20,000 f.p.m. It is felt that these speeds are necessary to give a high quality cut, and perhaps more importantly to build up a reservoir of energy which can be applied to produce a rapid cut. Varying degrees of success have been achieved by the devices now known.

One problem with the majority of circular saw devices is that they are bulky and heavy. One reason for this is that the rotary cutter running on a central axis must have a diameter at least twice that of the tree or limb to be cut plus space required for the hub and axle. It has been found that a minimum size for the saw is about 2½ times the diameter of the largest tree to be cut.

Another reason contributing to the bulkiness of circular saws is that, in many cases they require protection, particularly where slim disks are used to minimize the kerf loss. Also, in many instances, the saw blade is retractably mounted in a housing which increases the bulk of the device and requires additional apparatus to effect a reciprocating stroke at least equivalent to the largest diameter to be cut.

Another major drawback to the use of circular cutting blades in the cutting of trees and limbs is that as the teeth of the blade are advanced through the tree, the trunk or branch flexes due to its own weight. Although the teeth of the saw are relatively unaffected, the central portion of the blade may become pinched and bound. Blade binding creates a greater load under which the saw must work. Often, the blade's speed slows significantly or stops altogether. In such cases, it becomes difficult to merely remove the saw blade. In other instances, the saw may "kick-back" against the additional load, placing the saw operator in danger of injury. Binding further acts to reduce blade and tool life.

General procedures have evolved in tree work to deal with blade binding. Tree workers often must tie ropes around limbs or trunks in order to pull against binding forces. Such ropes must be fastened to high tree regions, creating greater work effort and risk for workers. Usually branches are cut in a stroke from top to bottom of the branch in order to prevent blade binding. However, the downward stroke seldom makes a clean cut through the branch. Usually, once the branch is substantially weakened at some point during the cut, the remaining wood, no longer capable of sustaining the weight of the distal branch portion, snaps and bends. A ragged portion of the stump is left, often with resultant splitting or peeling of wood and bark on the stump.

Numerous saw devices have been disclosed in the prior art which seek to eliminate the potential for binding, most notably the annular saw blade. Various annular blades have been employed in attempts to make a clean pass through a tree trunk or branch. Annular blades have further been introduced in order to reduce the diameter of blade necessary and the attendant weight and bulk of apparatus necessary to drive and protect the blade. This reduction is achieved through the greater portion of the blade which may be cleanly passed through the trunk or branch owing to tangential rather than central disposition of drive mechanisms.

Annular saws have been known for more than a hundred years. In relation to conventional circular saws they have, however, until recently had little importance. The fitting of an annular saw with a suitable power unit requires considerably more advanced technical solutions than the fitting and driving of a conventional circular saw. It can be said that there are two main principles for fitting and driving an annular saw blade. In one principle, both drive rollers and support rollers work on the web portion of the blade. The drive rollers operate through either a gear drive acting upon a cut-out in the saw blade, or a friction drive which is more usual and often preferred. In order that such friction drive may function properly, the drive rollers must be pressed forcefully against the body of the saw blade. This leads to severe heating of the saw blade so that the latter buckles. Annular saws with drive rollers which work through a friction coupling against the body of the saw blade are described for example in U.S. Pat. Nos. 3,930,310 and 4,316,328.

In a second principle of drive, the inner rim of the saw blade is acted upon, as described in U.S. Pat. No. 4,472,880. The annular saw of this patent is an improvement over earlier designs. The design, however, is not completely without disadvantages. In order that a safe friction coupling may occur between the drive surfaces on drive pulleys which form part of the drive system, and which are pressed in opposite directions towards each other at right angles to the plane of symmetry of the saw blade so that the rim section of the saw blade is gripped between the drive pulleys, the pressing force must be great. This produces severe heating of the rim section. This does not bring about buckling of the saw blade, especially as the design permits the saw blade to be cooled with cooling liquid, but it entails considerable loss of energy, so that the drive effect is considerably impaired. Liquid cooling requires additional hoses, fittings and connections which also add weight and limit the effective distance at which the saw may be operated from the user and coolant source.

U.S. Pat. Nos. 4,793,065 and 5,009,011, both to Johansson each disclose annular blade saws which may be hand held. However these saws are powered by a hydraulic motor through which hydraulic fluid must be pumped. The hydraulic motor, pressure, and return hoses add significant weight to the saw. It is evident that use of this saw must occur in close proximity to the hydraulic pumping means because a long expanse of hydraulic hose would preclude manual lifting to significant heights. Furthermore, the friction drive rollers are proportionally large and contribute weight.

U.S. Pat. No. 4,593,733 to Hamilton discloses a tree felling head which includes a frame having a grapple mounted thereon with a grapple jaw which may be selectively opened and closed to respectively receive and grasp a standing tree. Power means selectively open and close the grapple. A severing device mounted on said frame below said grapple device is a rim driven circular saw mounted on an arm pivotally attached to the frame for movement in a horizontal plane. A second power means effects rotation of said severing device.

The Hamilton cutting head does not disclose an annular cutting ring blade, however, it makes use of a rim gear drive means comprising a power means having a drive shaft adapted to rotate in an axis which is parallel rather than orthogonal the plane of the cutting blade. A pinion gear disposed upon the drive shaft, meshes with gear teeth adjacent the rim of the saw blade, and thereby provides rotational drive to the blade. Although the Hamilton device discloses this drive means, it is particularly adapted to fell standing trees at the base and is not amenable to cutting a substantially horizontal branch, due to its design and weight.

In order that a ring saw may be used to sever an overhanging limb, certain characteristics are desirable and/or necessary. The preferred saw device must be lightweight in order that it may be mounted upon an elongated handle capable of reaching the limb by the operator standing upon the ground below. None of the aforesaid devices are of sufficiently lightweight construction. The use of gasoline and hydraulic motors contribute significant weight to the devices. Furthermore, energy sources such as gasoline, and cooling means contribute weight and bulk. Extended hydraulic and cooling hoses are heavy and not amenable to extension of the saw means to significant heights. Furthermore, hydraulic and gasoline motors overhead can leak fluids upon the operator.

Gasoline motors are furthermore not amenable to the task of cutting overhead limbs due to fire hazards. Often a limb to be severed may have a plurality of dried leaves attached. Hot engine exhaust can ignite such leaves, and if the engine unit falls to the ground, a fuel tank rupture may occur.

It is furthermore desirable to have a well balanced saw means to enable the unit to be extended overhead. The effective weight of an unbalanced unit may be multiplied many times when supported by a long lever arm in the form of an extension handle. Additionally, the cutting extremity of the blade should preferably by symmetrically opposed to the handle means in order that force used to support the unit overhead may be efficiently transmitted in a vertically upward direction into the cutting stroke.

The use of a saw in an overheat cutting job brings with it a number of considerations. In addition to the weight of the cutting head, other forces are transmitted through an extended handle. Merely raising a long assembly, comprised of a saw unit mounted at the distal extremity of a pole, in a arcuate manner from horizontal to vertical disposition by an operator holding the proximal extremity may require a vectored force greater than an individual may be capable of. Once cutting commences, a torque force is exerted in the direction opposite to the direction of blade rotation. This force may be greater than an individual may be capable of restraining, causing the blade to "walk" across and out of contact with the overhead hub.

Due to design constraints, the ring saw devices heretofore proposed are not amenable to the task of extended overhead cutting of tree limbs.

It is therefore an object of the present invention to provide a rotary saw which may be positioned overhead to effect an upwardly directed cutting stroke.

It is another object of the present invention to provide a saw of the aforesaid nature which is durable in construction, simple to use, easily maintained, and amenable to low cost manufacture.

These and other beneficial objects and advantages will be apparent from the following description.

SUMMARY OF THE INVENTION

The above and other beneficial objects and advantages are accomplished in accordance with the present invention by an annular blade saw adapted for rotation in a vertical plane to effectively sever a tree limb in an upwardly directed substantially vertical cutting stroke, said saw comprised of:

a) a housing comprised of paired spaced apart panels defining an interior region elongated upon a center axis between an arcuate forward portion bounded by paired arms symmetrically disposed about said axis and a rearward portion having means for receiving a supporting handle, b) an electric motor disposed within said housing and having a forwardly directed drive shaft in parallel disposition to said axis, c) drive transmission means orthogonally associated with said drive shaft, d) a plurality of idler rollers disposed in a circular locus and orthogonally communicating between said plates within said arcuate portions, e) an annular cutting blade adapted to rotate partly within said arcuate portion, said blade having an axis of rotation, an outer perimeter comprised of a multitude of radially aligned cutting teeth, and a concentric inner rim rotatively engaged by said idler rollers to support said blade in parallel disposition between said housing plates, said blade having a plurality of uniformly spaced drive apertures spaced in a circular array about said axis of rotation and adapted to be engaged by said drive transmission means, f) a plurality of elongated handle extensions, each extending between forward and rearward extremities adapted to interlock with successive extensions, g) electrical power supply means comprised of an electrical switch means, a main power cord having a male plug connector, a plurality of extension cord means, each associated with a corresponding handle extension and elongated between a distal extremity having a female plug, and a proximal extremity having a male plug, said plug adapted to make successive interlocking electrical connection, h) an abutment bar forwardly directed from one of said arms, and i) hook means fixedly associated with the forward extremity of said abutment bar, and adapted to engage a tree limb, thereby supportively hanging said saw, whereby:

1) said saw may be hooked to a tree limb, and thereby supported in vertical disposition, 2) a handle extension may be interlocked to said saw and said saw may be vertically advanced to another tree limb for addition of another handle extension, 3) this process may be repeated until the limb to be severed has been reached, 4) corresponding electrical plug connections are made as handle extensions are added, 5) an upwardly directed vertical cutting stroke may be initiated, In an preferred embodiment, the drive effecting means may be in the means of a spur gear. The abutment means should be preferably located upon the appendage located upon the down stroke side of the blade rotation.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 6 is a sectional view taken upon the line 6—6 of FIG. 4.

FIG. 11 is a schematic view illustrating the operation of the saw.

DESCRIPTION OF THE PREFERRED EMBODIMENT

Figure 1:
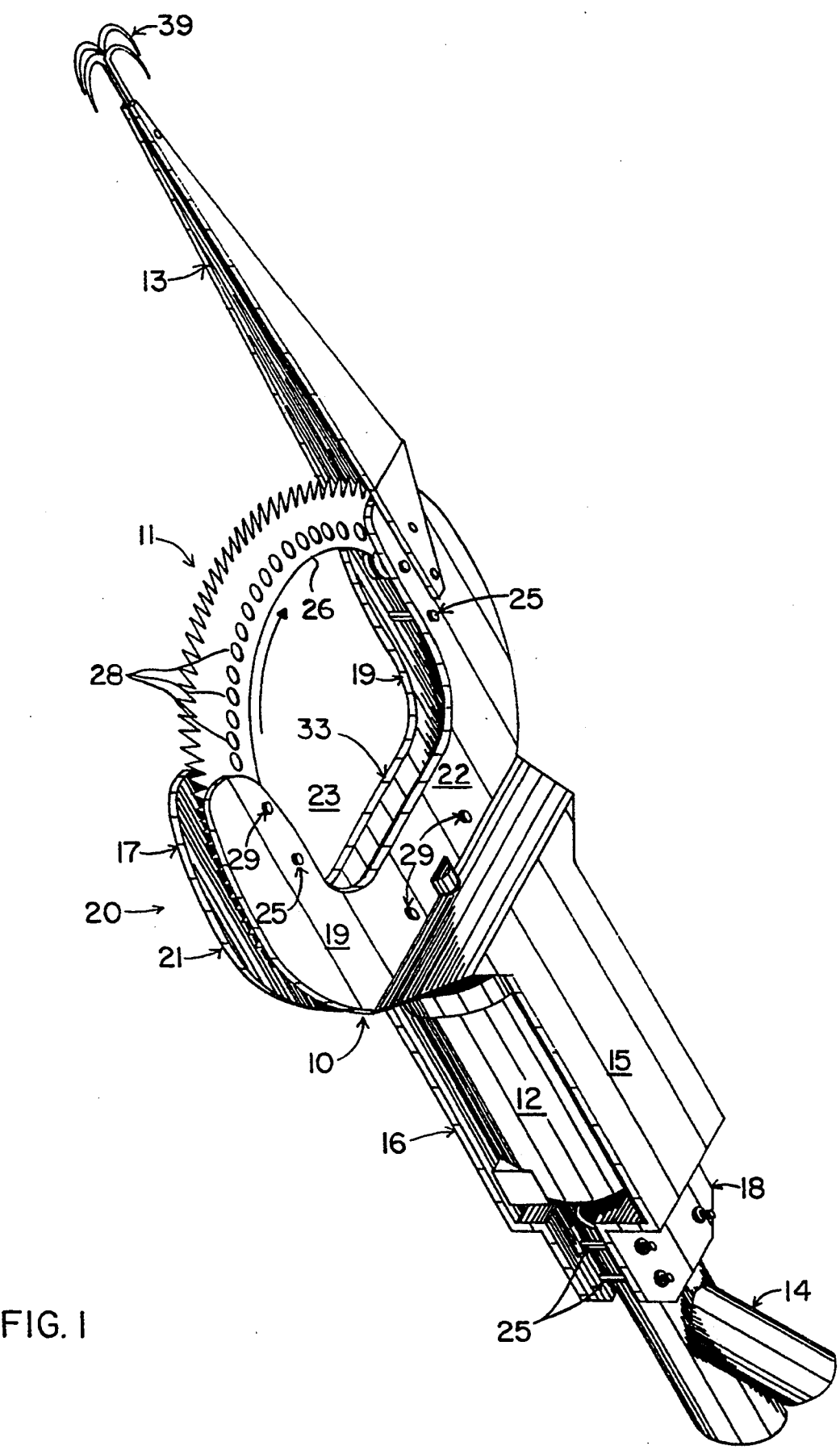
FIG. 1 is a perspective view of an embodiment of the saw of the present invention.
Figure 2:
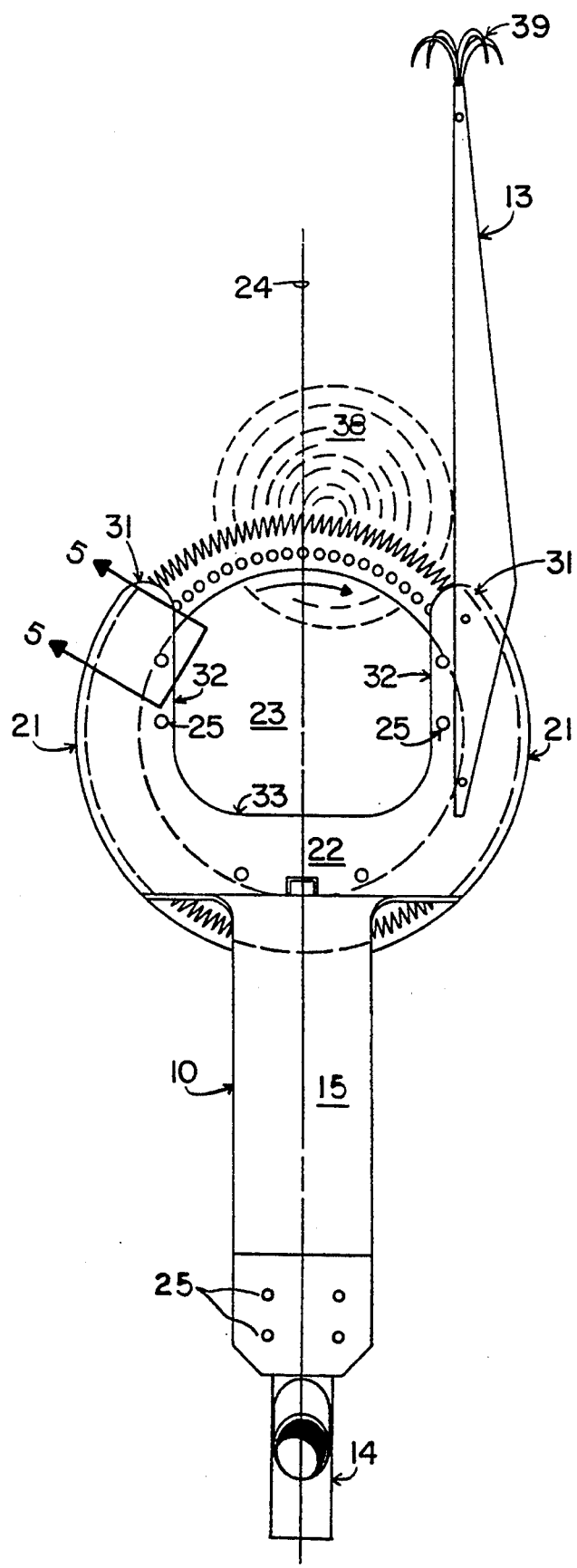
FIG. 2 is a side view of the embodiment of FIG. 1.
Figure 3:
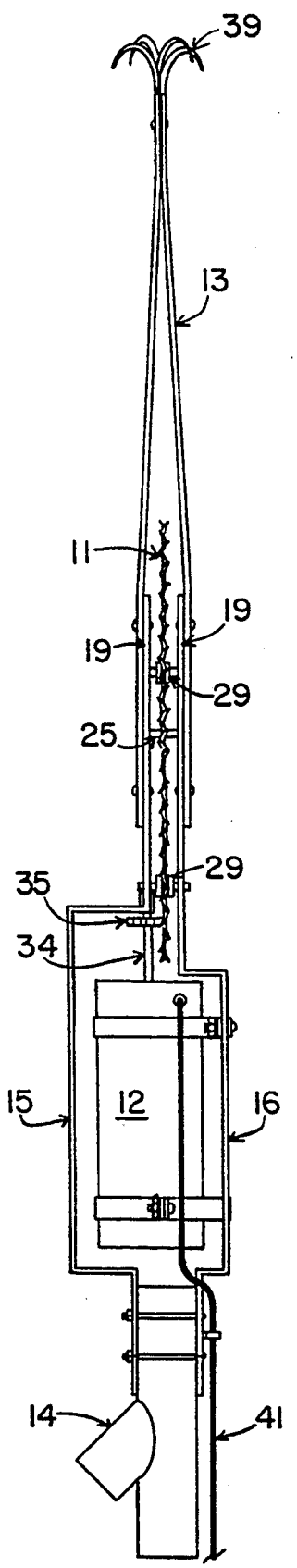
FIG. 3 is an end view of the embodiment of FIG. 1.
Figure 4:
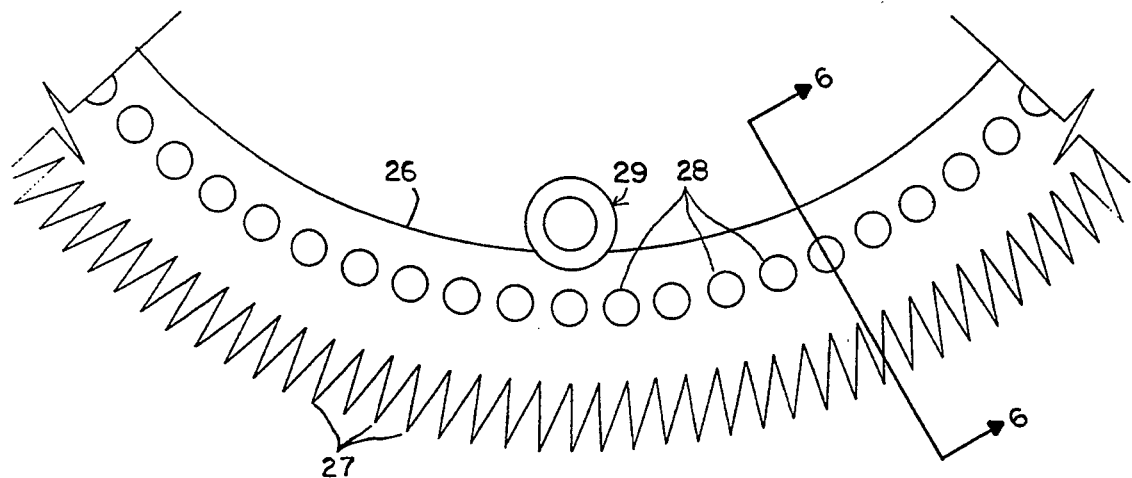
FIG. 4 is an enlarged fragmentary side view.
Figure 5:
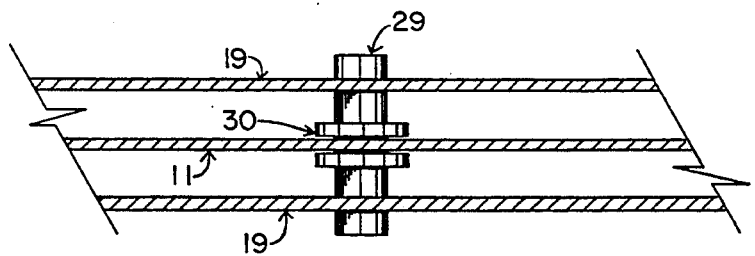
FIG. 5 is an enlarged fragmentary view taken in the direction of the arrows upon the line 5—5 of FIG. 2.
Figure 8:
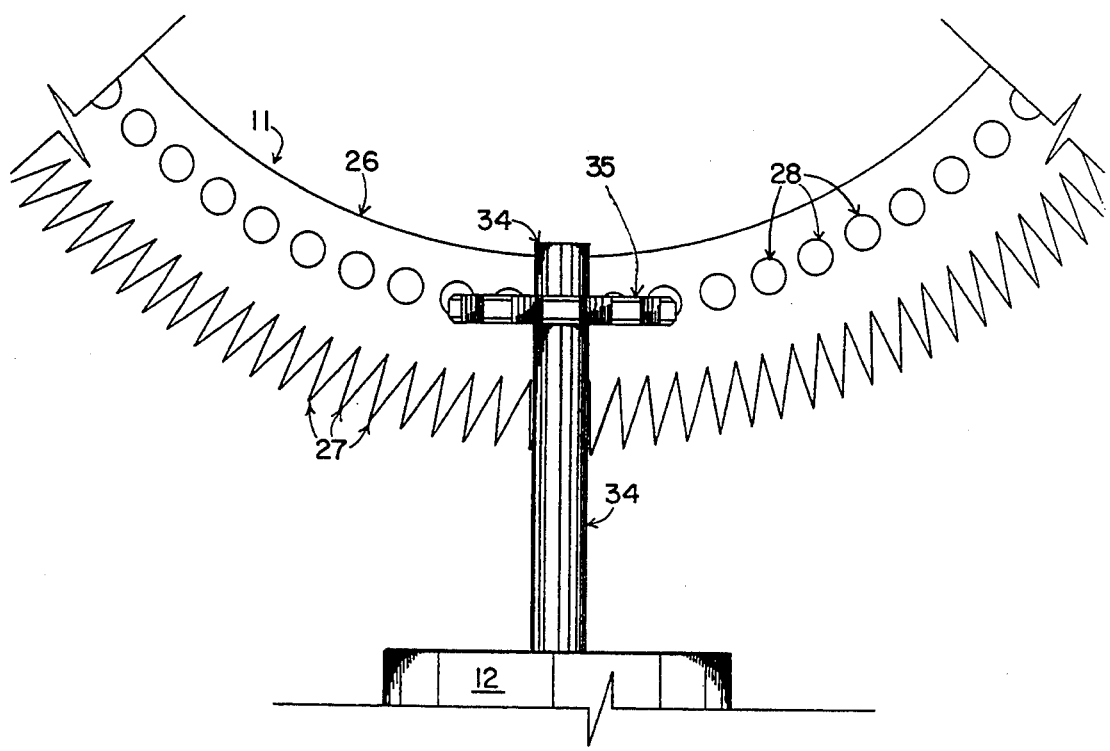
FIG. 8 is a view taken orthogonally to FIG. 7.
Figure 7:
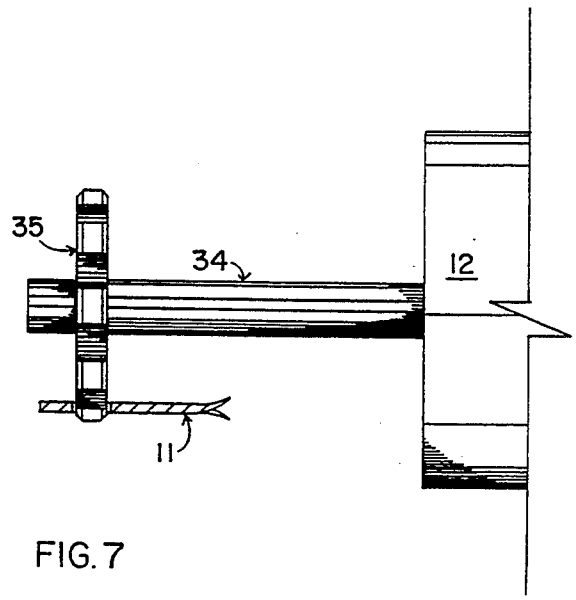
FIG. 7 is an enlarged fragmentary side view.
Figure 9:
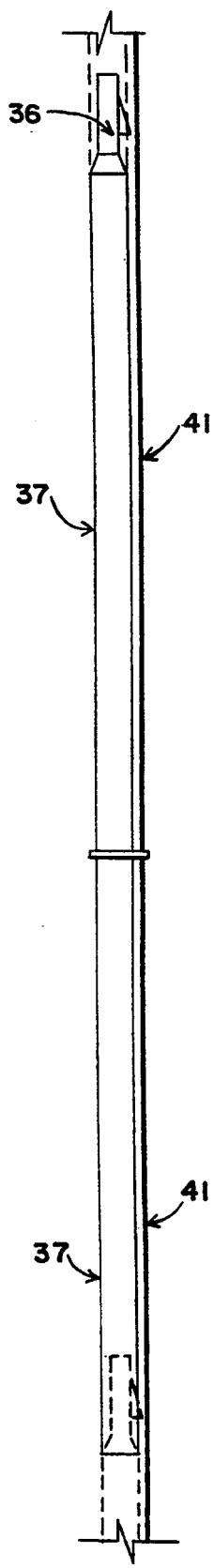
FIG. 9 is a side view of the extension pole structure employed with the embodiment of FIG. 1.
Figure 10:
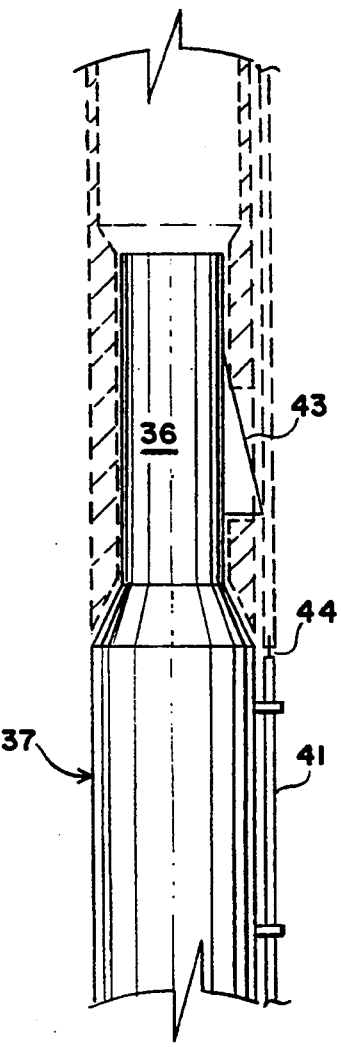
FIG. 10 is an enlarged fragmentary side view of the pole of FIG. 9.

Referring to FIGS. 1–11, an embodiment of the saw of the present invention is shown comprised of a housing 10 which substantially encloses annular saw blade 11 and electric motor 12, an abutment bar 13 extending forwardly of said housing, and handle securing means 14 extending rearwardly of said housing.

The exemplified embodiment of housing 10 is comprised of upper and lower panel members 15 and 16, respectively, each extending in spaced apart facing relationship between forward and rearward extremities 17 and 18, respectively. The panels are preferably of monolithic construction, formed of a lightweight strong metal or plastic, having been shaped by way of molding or other thermoforming operation. The forward portions 19 of both panel members are of identical flat shape and spaced apart in aligned parallel relationship to form a yoke structure 20 having parallel opposed arms 21 interconnected by a heel region 22. Such configuration defines a forwardly directed u-shaped opening 23 symmetrically disposed about a plane of symmetry 24 centered between arms 21 and orthogonally disposed to panel members 15 and 16. Said panel members are secured in spaced apart relationship by several spacer posts 25.

Annular saw blade 11 has a smooth inner circular perimeter 26 and an outer circular perimeter having a multitude of uniformly spaced saw teeth 27. A series of uniformly spaced drive apertures 28 is disposed in a circular locus coaxial with said inner perimeter and located about half way between said inner and outer perimeters. The diameter of said outer perimeter is preferably between about 8 and 15 inches. The blade width, measured in the radial direction between said inner and outer perimeters, is between about 1 and 2 inches. The saw teeth are preferably disposed on a cross-cut configuration, namely alternating in their direction of cut angle with respect to the plane of the blade. The number of saw teeth per linear inch is preferably between about 4 and 5. Although the illustrated drive apertures are circular, other shapes may be utilized. The saw blade is fabricated of an alloy type steel as generally employed for saw blades, and will have a thickness between 0.155 and 0.180 inch.

The saw blade is secured in parallel relationship between forward panel portions 19 by idler guides 29 extending between and pivotably held by said panel portions 19. Each idler guide has a centered annular groove 30 adapted to engage inner perimeter 26. In the illustrated embodiment, an idler guide 29 is located in each arm 21, and two idler guides are positioned in heel region 22.

The configuration of U-shaped opening 23 with respect to the dimensions of saw blade 11 is such that between 80 and 90 degrees of circular arc of said outer perimeter protrude forwardly of the forward extremities 31 of arms 21. Accordingly, the maximum cutting width achievable by blade 11 is determined by said protruding portion of said blade and the distance of separation between the straight interior edges 32 of arms 21. It is further to be noted that the depth of opening 23, namely, the distance between forward extremity 31 and the interior edge 33 of heel region 22, measured parallel to plane 24, is substantially equal to the aforesaid distance of separation between facing interior edges 32 of arms 21. By virtue of such critically selected dimensional relationships, opening 23 can accommodate a tree limb whose diameter is close to the diameter of inner perimeter 26.

Electric motor 12, which may be of 2 to 2.5 horsepower, is mounted within housing 10 rearwardly of heel region 22. Drive shaft 34, emergent from said motor, is positioned to be parallel to said saw blade and centered within vertical plane 24. Drive transmission means in the form of a spur gear 35 is orthogonally affixed to drive shaft 34 and positioned to engage drive apertures 28. The eight teeth on the exemplified embodiment of gear 35, and other design features are such as to produce a blade speed of 4.51 feet per second at said outer perimeter. In other embodiments, the blade speed may be in the range of 4 to 8 feet per second.

Handle securing means 14, disposed rearwardly of motor 12 is exemplified as female socket-type receptacle which receives the forward male extremity 36 of an extension pole 37. Several of such poles are included in the saw device of this invention. In the shown embodiment, each pole has a male-type forward extremity and female socket-type rear extremity. Spring biased snap-in connector means 43 assure positive engagement at each connection. Said poles further contain an electrical line 41 and interactive electrical connectors 44 at each site of interengagement with other poles. In such manner, a sequence of several poles may be assembled in stepwise manner to elevate the housing/saw blade component to cut an overhead limb, and concomittantly extend requisite electrical conductor means to service the motor. In the exemplified embodiment, the handle securing means is disposed at an angle to the plane of the blade. Such manner of construction facilitates use of the saw in the cutting of underbrush. In the preferred embodiment for the cutting of overhead limbs, the handle securing means is centered upon the plane of the blade.

Abutment bar 13, extending forwardly from housing 10, serves to permit the device to rest upon and be guided by the limb 38 which is being sawed. A grapple-type hook 39, positioned at the forward extremity of said abutment bar, enables the device to be suspended from an overhead limb while additional poles are added to the handle structure. The abutment bar also prevents the saw from "walking" while operating on the limb. It should be noted that the abutment bar is positioned upon the arm toward which the saw blade is rotating.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An annular blade saw adapted for rotation in a vertical plane to sever a tree limb in an upwardly directed cutting stroke, said saw comprised of:
    a) a housing comprised of paired spaced apart panels defining an interior region elongated upon a center axis between a forward receiving yoke bounded in part by paired arms symmetrically disposed about said axis, and a rearward portion having means for receiving a supporting handle,
    b) an electric motor disposed within said housing and having a forwardly directed drive shaft in parallel disposition to said axis,
    c) drive transmission means orthogonally associated with said drive shaft,
    d) a plurality of idler rollers disposed in a circular locus and orthogonally communicating between said panels adjacent said yoke,
    e) an annular cutting blade adapted to rotate partly within said yoke, said blade having an axis of rotation, an outer perimeter comprised of a multitude of radially aligned cutting teeth, and a concentric inner rim rotatively engaged by said idler rollers to support said blade in parallel disposition between said panels, said blade having a plurality of uniformly spaced drive apertures spaced in a circular array about said axis of rotation and adapted to be engaged by said drive transmission means,
    f) a plurality of elongated handle extensions, each extending between forward and rearward extremities adapted to interlock with successive extensions,
    g) electrical power supply means comprised of a main power cord and a plurality of extension cord means, each associated with a corresponding handle extension and elongated between said forward and rearward extremities and adapted to make successive electrical connection,
    h) an abutment bar forwardly directed from one of said arms, and extending to a forward extremity, and
    i) hook means fixedly associated with said forward extremity of said abutment bar, and adapted to engage a tree limb to supportively hang said saw.

2. The saw of claim 1 wherein said abutment bar is positioned upon that arm which represents the down stroke side of the blade rotation.

3. The saw of claim 1 wherein said receiving yoke is of U-shaped configuration.

4. The saw of claim 3 wherein said paired arms are in spaced apart parallel coplanar relationship, and are joined by a heel region of said housing to define said yoke of U-shaped configuration.

5. The saw of claim 1 wherein said axis of rotation is orthogonal to said panels.

6. The saw of claim 1 wherein said electric motor is of between 2 and 2.5 horsepower.

7. The saw of claim 6 wherein said blade has a speed of between 4 and 8 feet per second, measured at said outer perimeter.

* * * * *